US009262145B2

(12) United States Patent  
Grimme et al.

(10) Patent No.: US 9,262,145 B2
(45) Date of Patent: Feb. 16, 2016

(54) REMOTE SOFTWARE DEPLOYMENT ACROSS A NETWORK

(75) Inventors: David J. Grimme, Houston, TX (US); Vishwanath Rn, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/352,326

(22) PCT Filed: Oct. 31, 2011

(86) PCT No.: PCT/US2011/058512
§ 371 (c)(1),
(2), (4) Date: Apr. 17, 2014

(87) PCT Pub. No.: WO2013/066286
PCT Pub. Date: May 10, 2013

(65) Prior Publication Data
US 2014/0282413 A1   Sep. 18, 2014

(51) Int. Cl.
*G06F 9/445* (2006.01)
*H04L 12/24* (2006.01)
*G06F 11/36* (2006.01)
*H04L 29/08* (2006.01)

(52) U.S. Cl.
CPC .. *G06F 8/61* (2013.01); *G06F 8/60* (2013.01); *G06F 11/3672* (2013.01); *H04L 41/046* (2013.01); *H04L 41/082* (2013.01); *H04L 41/0853* (2013.01); *H04L 67/34* (2013.01)

(58) Field of Classification Search
None
See application file for complete search history.

(56) References Cited

U.S. PATENT DOCUMENTS 7,124,289 B1   10/2006   Suorsa
7,797,403 B2    9/2010   Vedula et al.
8,505,005 B1 *  8/2013   Bos et al. .................. 717/177
(Continued)

FOREIGN PATENT DOCUMENTS

WO    WO-0177854         10/2001
WO    WO-2007030633 A2    3/2007
WO    WO-2009082386 A1    7/2009

OTHER PUBLICATIONS

PCT; "Notification of Transmittal of the International Search Report and the Written Opinion of the International Searching Authority, or the Declaration"; cited in PCT/US2011/058512; mailed Jul. 31, 2012; 8 pages.

(Continued)

*Primary Examiner* — Isaac T Tecklu
(74) *Attorney, Agent, or Firm* — Brooks, Cameron & Huebsch, PLLC

(57) ABSTRACT

Methods, computer-readable media, and systems are provided for deployment of software tools across a network. One example method includes initiating a discovery mechanism to poll a plurality of computing machines 121-1, ..., 144-T from a remote deployment system 101 to multiple systems 120/130/140 across a network 108. The multiple systems 120/130/140 include computing machines 121-1, ..., 144-T having different operating system (OS) types. Respective agents 151 are deployed for each type of OS identified in the response to the discovery mechanism 210/220. Each of the respective agents 151 is configured to manage communications 230 between the deployment system 101 and the different OS types for each of the plurality of computing machines 121-1, ..., 144-T on the network 108 and to initiate application deployment and monitoring on each of the plurality of computing machines 230.

13 Claims, 2 Drawing Sheets

(56) References Cited

U.S. PATENT DOCUMENTS

| | | | |
|---|---|---|---|
| 2003/0208569 A1* | 11/2003 | O'Brien et al. | 709/221 |
| 2004/0267716 A1* | 12/2004 | Prabu et al. | 707/3 |
| 2006/0225070 A1* | 10/2006 | Childress et al. | 717/174 |
| 2006/0248522 A1 | 11/2006 | Lakshminarayanan et al. | |
| 2006/0253848 A1 | 11/2006 | Mathieu et al. | |
| 2006/0271923 A1* | 11/2006 | Bantz et al. | 717/168 |
| 2006/0272020 A1* | 11/2006 | Gardner | 726/23 |
| 2007/0168919 A1 | 7/2007 | Henseler et al. | |
| 2008/0028368 A1 | 1/2008 | Depew et al. | |
| 2008/0155245 A1* | 6/2008 | Lipscombe et al. | 713/2 |
| 2008/0178172 A1* | 7/2008 | Dossa et al. | 717/174 |
| 2008/0244519 A1* | 10/2008 | Sciacqua et al. | 717/120 |
| 2008/0295064 A1 | 11/2008 | Mitra et al. | |
| 2009/0083404 A1 | 3/2009 | Lenzmeier et al. | |
| 2009/0119660 A1 | 5/2009 | Redpath | |
| 2010/0106678 A1* | 4/2010 | Pietrek et al. | 706/54 |
| 2010/0318967 A1 | 12/2010 | Bhatia et al. | |
| 2011/0154324 A1* | 6/2011 | Pagan et al. | 718/1 |
| 2011/0258595 A1 | 10/2011 | Clevenger | |
| 2012/0096135 A1* | 4/2012 | Berube et al. | 709/223 |
| 2013/0103973 A1* | 4/2013 | Werth et al. | 714/2 |
| 2014/0164598 A1* | 6/2014 | Srinivasan | 709/224 |

OTHER PUBLICATIONS

Van Der Burg, S., et al.; "Automated Deployment of a Heterogeneous Service-oriented System"; 2010 26th EUROMICRO Conference on Software Engineering and Advanced Applications: 8 pages.

EP Application 11875179.1 Extended European Search Report, Mar. 24, 2015, 7 pps.

* cited by examiner

REMOTE SOFTWARE DEPLOYMENT ACROSS A NETWORK

BACKGROUND

In a computing machine, such as a server, router, computer, laptop, PDA, mobile phone, netbook, etc., and other devices having processor logic and memory, the computing machine can have an operating system installed thereon, and may further include a number of application programs that execute on the computing machine. However, after manufacture and/or assembly, the operating system and application programs first have to be loaded onto the computing machine.

Computing systems can include multiple computing machines, which may be communicatively coupled over a network. The computing machines may, from time to time, be managed. For example, managing a computing machine can include loading and/or updating an operating system and/or application programs. The computing machine may subsequently be managed, such as to upgrade, replace, or troubleshoot the operating system and/or application programs; add, remove, or modify access rights; add/remove additional application programs; or examine and modify filesystems, execute commands, and/or perform other hardware, software, or operational manipulations.

In order to bring-up server racks or Performance Optimized Datacenters (PODs) in factory or solutions environments, customer sites, and internal labs, software has to be deployed to and tested across a large number of machines. Existing efforts to do so involve more infrastructure than the base Out Of the Box (OOB) operating system (OS), do not communicate across different OS types, and may not even be aware of all user-specified software tools and utilities to monitor their execution on remote machines'.

DETAILED DESCRIPTION

Methods, computer-readable media, and systems are provided for deployment of software tools across a network. One example method includes initiating a discovery mechanism to poll a plurality of computing machines from a remote deployment system to multiple systems across a network. The multiple systems include computing machines having different operating system (OS) types. Respective agents are deployed for each type of OS identified in the response to the discovery mechanism. Each of the respective agents is configured to manage communications between the deployment system and the different OS types for each of the plurality of computing machines on the network and to initiate application deployment and monitoring on each of the plurality of computing machines.

Each computing machine can be individually managed locally. However, an enterprise may have one or more computing systems, each comprising one or more computing machines. For example, an enterprise may have thousands of computing machines to manage, some portion of which may be communicatively coupled to a network, such as a local area network, wide area network, intranet, Internet, or other network. Managing large quantities of computing machines individually (e.g., locally) can be time consuming, expensive, and yield inconsistent results.

A server automation system may be used to manage a number of servers, including virtual servers, one at a time or as a group. A server automation system can include a server automation software core and a number of remote server automation remote software agents. Server automation systems can be used to manage servers using distributed scripts, manage software using policies, manage (e.g., install and uninstall) packages and patches, manage system and application configuration files, manage server compliance through automation and remediation features, and run reports, etc. The server automation software core may be in communication with the number of remote server automation remote software agents over a network.

In the present disclosure, embodiments are described for a scalable tool to automate deployment, control and monitoring of included or user-specified software tools from one system to multiple systems across a network. The scalable tool uses only the base OS, meaning the volume or retail OS image or the customer specified OS image and a root user name and password for a remote system connected to a network. The scalable tool can discover and profile remote systems across the network, group those systems into logical groups, specify the tests or tools to run on them and their parameters, specify sequences of actions or tools to run, install those tools, monitor the results, and record the results in a database.

Figure 1:
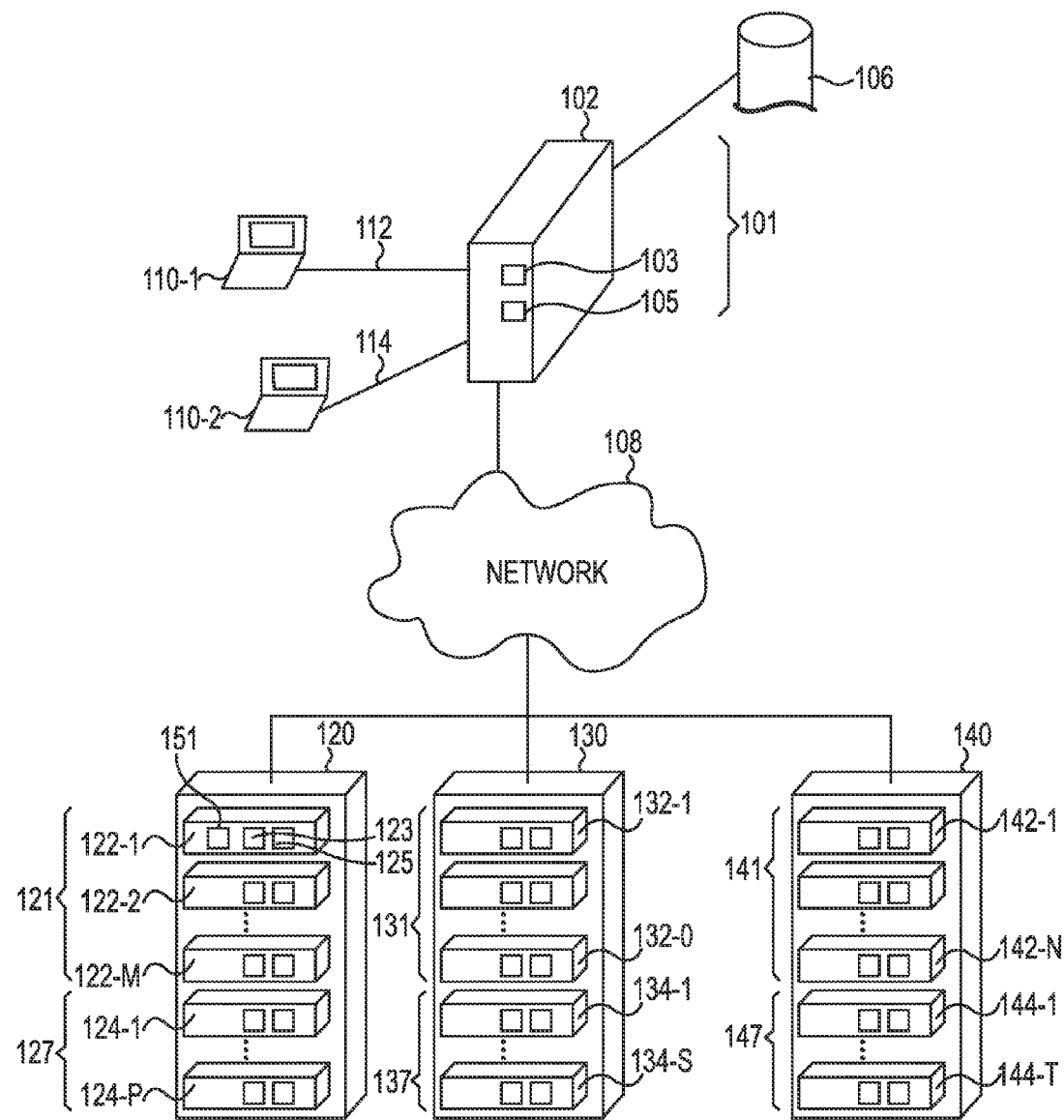
FIG. 1 is a block diagram of a computing system suitable to implement one or more embodiments of the present disclosure.

FIG. 1 is a block diagram of a scalable tool, e.g., software in the form of machine executable instructions, to automate deployment, control and monitoring of included or user-specified software tools from one system 101 to multiple systems, e.g., 120, 130 and 140, across a network 108.

FIG. 1 illustrates a server 102 having processor 103 and memory 105 resources. The scalable tool, described herein, is in the form of machine executable instructions that can be stored on memory resources 105 and executed by processor resources 103 of server 102 to implement the one or more embodiments of the present disclosure. Memory resources may include both non-persistent memory such as random access memory (RAM), for example, and persistent memory such as a hard drive and/or solid state drive (e.g., flash memory, phase change memory, etc.), among others. The server 102 can be connected to one or more user interfaces 110-1 and 110-2 via hard-wired 112 or wireless 114 connections and further to one or more databases, e.g., 106, to provide the remote software deployment system 101. Database 106 may store information, such as hardware and software information relating individually and collectively to one or more target systems, 120, 130, 140, etc., being managed by the software deployment 101.

While FIG. 1 is described with respect to a computing system comprising servers, embodiments of the present invention are not so limited. It will be understood that the following discussion is applicable to computing systems comprising additional and/or other types of computing machines as well. Also, a single server 102 is shown for simplicity in the software deployment system 101. However, embodiments of the present disclosure are not so limited. The software deployment system 101 may be running on one or more core management servers.

As shown the software deployment system 101 can be connected to multiple different systems, 120, 130 and 140, over a network 108. Network 108 may a local area network, wide area network, intranet, Internet, other network arrangement, or a combination of network arrangements, including hard-wired and/or wireless portions thereof. Examples of the different systems 120, 130 and 140 can include server racks and/or Performance Optimized Datacenters (PODs). The different systems, 120, 130, and 140 may be maintained by different service providers such as internet search services and web retailers, e.g., Bing® and eBay®, and/or different high performance computing facilities, e.g., universities and/or other scientific research centers.

System 120 is illustrated including a number of computing machines, e.g., servers, of a first type 122-1, 122-2, . . . , 122-M, including processor and memory resources 123 and 125, which could belong to a first logical group 121. System 120 is further illustrated having a number of computing machines, e.g., servers, of a second type 124-1, . . . , 124-P, including processor and memory resources, which could belong to a second logical group 127. System 130 is illustrated including a number of computing machines of a first type 132-1, . . . , 132-O, including processor and memory resources, which could belong to a first logical group 131. System 130 is further illustrated having a number of computing machines of a second type 134-1, . . . , 134-S, including processor and memory resources, which could belong to a second logical group 137. System 140 is illustrated including a number of computing machines of a first type 142-1, . . . , 142-N, including processor and memory resources, which could belong to a first logical group 141. System 140 is further illustrated having a number of computing machines of a second type 144-1, . . . , 144-T, including processor and memory resources, which could belong to a second logical group 147. As used herein, such logical groups can be user defined and can be according to hardware, software, operating system, available resources, intended use, etc. However, embodiments are not limited to the number and type of logical grouping on any given system 120, 130 and 140. Hence, the designators M, P, O, S, N, and T may represent a number within any given grouping.

FIG. 1 shows three example system configurations connected to the deployment system 101 over a network 108, however embodiments of the present disclosure are not so limited, and the deployment system 101 may connect to more, or fewer, target systems having the configurations shown, or with other configurations. While target systems 120, 130 and 140 are shown as server racks in FIG. 1, a target system 120, 130 and 140 may comprise one or more different server racks, PODs, and/or computing configurations in addition to other hardware, software, and/or firmware.

According to one or more embodiments, at least one of the target systems 120, 130 and 140 is provisioned with a lightweight agent 151 from the deployment system 101 to facilitate the automated deployment, control, and monitoring of included and/or user-specified software tools. While only computing machine 121-1 is illustrated as having a lightweight agent 151 deployed thereon, all or fewer of the plurality of remote computing machines, 121-1, . . . , 144-T, and/or target systems 120, 130 and 140 may, individually or collectively according to a particular logical groupings, have lightweight agents deployed thereon from the software deployment system 101. The term lightweight agent refers to a set of machine executable instructions delivered to and stored on a target computing machine where the instructions are able to manage communication, including status, between the target computing machine and the remote software deployment system 101. The lightweight agent can further download and install applications and/or functional tests to the target computing machine, but does not itself contain those applications or functional tests. As such, the lightweight agent, e.g., 151, does not serve as the operating system for the target computing machine.

Figure 2:
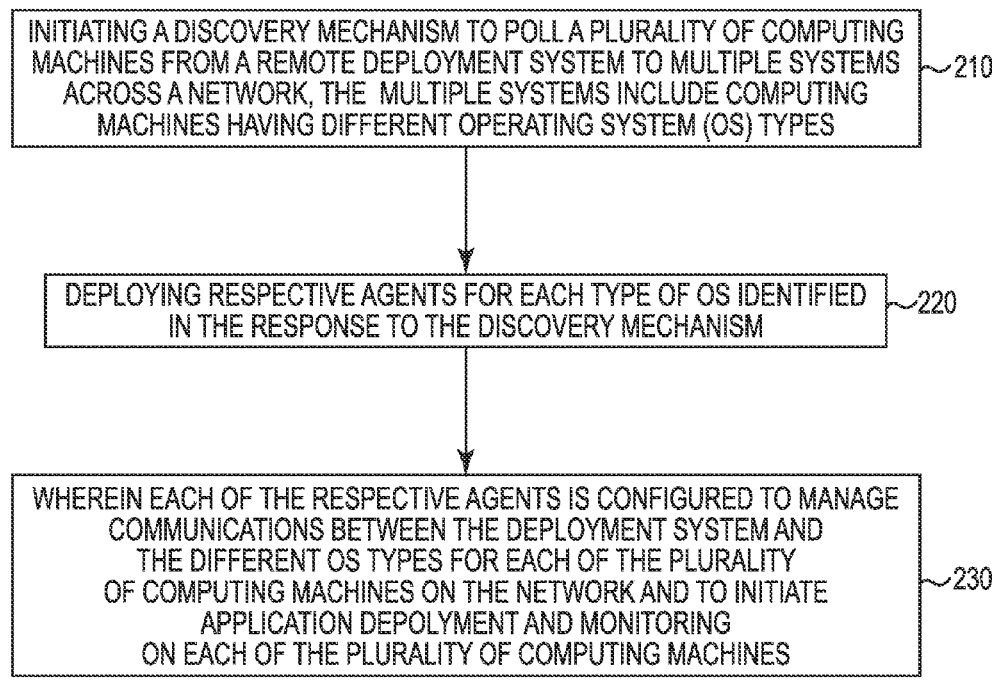
FIG. 2 is a flow chart illustrating a method for deployment of software tools across a network from one system to multiple systems according to one or more embodiments of the present disclosure.

FIG. 2 is a flow chart illustrating a method for deployment of software tools across a network from one system to multiple systems according to one or more embodiments of the present disclosure. As shown at 210, in the embodiment of FIG. 2 one example method includes executing instructions stored in the memory 105 of the software deployment system 101 to initiate a discovery mechanism to poll a plurality of computing machines, e.g., the plurality of computing machines in the multiple systems 120, 130 and 140. Initiating a discovery mechanism can include initiating an Internet Communication Message Protocol (ICMP) ping to each of the plurality of computing machines in the multiple systems 120, 130 and 140. According to embodiments, various computing machines among the plurality of computing machines within each of the multiple systems 120, 130, 140 may have different operating system (OS) types, e.g., Windows®, Linux®, Unix®, etc. The various machines within a given system, 120, 130 and 140 may have different OS types since the service provider, e.g., operator of a particular system, may want to offer different OS type alternatives to its customers. Hence the response to the software deployment system 101 discovery mechanism, e.g., ICMP ping, will indicate to the software deployment system 101 an OS type for each computing machine's identifier among the various computing machines in the multiple systems 120, 130 and 140. Such information, among other information, may be stored in a given computing machine's Management Information Base (MIB). Other information that can be obtained from the discovery mechanism includes the number and type of processor resources for each of the plurality of computing machines, the number and type of memory resources, the make and model type of each computing machine, driver and/or network connection counts, etc.

According to various embodiments, the discovery mechanism, e.g., instructions executed by the software deployment system 101 to poll the plurality of computing machines, can further discover remote units, e.g., computing machines in the multiple systems, on a network using a multiplicity of query methods. The multiplicity of query methods to the plurality of computing machines can include an Internet Protocol (IP) address range query, a media access controller (MAC) address list query, subnet query, a fully qualified domain name list, computing machine specific name query, among other query types.

The ability to perform a multiplicity of query types may provide certain advantages. For example, it may be advantageous to query by a specific computing machine name since a change to a Network Interface Card (NIC) or a reboot to a given computing machine may change the MAC address list and/or IP address range but the computing machine's name would not change. As another example, in a Linux® OS environment various computing machine names may not have been assigned yet, but the machines may have an MAC address or assigned IP address range to query by. The machine name query mode can support a file input that can be either a list of names, or a list of IP addresses, or a combination thereof. An IP range query can search and discover all contiguous IP addresses in that range. The list mode allows the search and discovery of a non-contiguous range of IP addresses. Either a MAC list mode or the name/IP list input mode can facilitate discovery of missing computing machines and report that same to the software deployment system 101.

At 220, the method includes deploying lightweight agents to each of the plurality of computing machines for each respective type of OS identified in the response to the discovery mechanism, e.g., Windows®, Linux®, Unix®, etc. The lightweight agents can execute instructions to fully profile the characteristics of each respective computing machine to which they have been deployed. Fully profiling the characteristics of each respective computing machine includes: complete OS type information (e.g., version and/or name), computing machine model name, complete memory information, disk space, etc.

At 230, according to various embodiments, the respective lightweight agents, deployed to each respective computing machine, can execute instructions to manage communication, including status, between the target computing machine and the remote software deployment system 101. Within and across the multiple systems the instructions of the lightweight agents are able to communicate with one another and the software deployment system 101, regardless of the OS type.

The lightweight agents, deployed to each respective computing machine, can execute instructions to initiate application deployment user-specified software tools, e.g., software application, from the software deployment system 101 to each of the respective computing machines in the multiple remote systems. The term user-specified tools can include various software tools requested by a user, e.g., IT administrator, for various computing machines in a given system. Examples of user specified tools may include BIOS update firmware, software and/or firmware patches and/or drivers, instructions to enumerate parameters to particular computing machines, etc., in the multiple systems 120, 130 and 140. Additionally, the lightweight agents, deployed to respective computing machines, can execute instructions to run applications already included on the respective computing machines from the out of the box environment (OOBE).

According to various embodiments, the deployed agents to each computing machine, can execute instructions to logically group computing machines within and across multiple systems 120, 130 and 140. For example, in an environment with thousands of machines in a given system, the lightweight agents can execute instructions to deploy various user-specified applications to a particular logical grouping according to a particular fiber demarcation. There may be at least two levels of granularity to the lightweight agents executing instructions to deploy particular applications. In a first example, the respective lightweight agents may be automatically configured to deploy applications to certain logical groupings of computing machines in the multiple systems 120, 130 and 140 to conduct basic functional and/or operating tests for the processor resources, memory resources, connections, speed and response time, etc. For example, if there are N processors in a given machine, the lightweight agent may deploy an application to the computing machine to execute $2^N$ processor test threads.

In a second example, a user may direct a particular logical grouping according to various characteristics (e.g., computing machine type, processor resources, memory resources, OS type or text identifier, IP addresses, computing machine name, etc.) by communicating through the respective lightweight agents with the software deployment system 101. Hence the user directed logical grouping may cause the lightweight agents to execute instructions to deploy different functional test applications on different machines based on the logical grouping (e.g., characteristics) of the different machines in order to run test based on given computing machines capabilities or intended application in the field. For example, if fifty (50) computing machines in a given server rack are memory, e.g., storage node, intensive, then the user directed logical grouping may cause the lightweight agents on those machines to execute instructions to deploy memory functional test applications to ascertain the functionality of the storage nodes on those computing machines. If another fifty (50) computing machines in the same server rack are processor intensive, e.g., computational nodes, then the user directed logical grouping may cause the lightweight agents on those machines to execute instructions to deploy processor functional test applications to ascertain the functionality of the computational nodes on those computing machines.

In these examples the user, e.g., IT administrator, can select included or user-specified software tools, e.g., functional tests, and their parameters, such as subtests or durations, and sequences of the tools, tests or actions in test configurations and action groups or sequences. The instructions of the software deployment system 101 can be executed to allow the user to map the computing machine logical groupings to test sequence action groups. The instructions of the software deployment system 101 are then executed to install the particular functional test applications to selected computing machines according to the logical groupings, remotely start the functional test applications, e.g., programs, running. Thus, different functional test applications may be run concurrently on different computing machines based on their characteristics.

As the different functional test applications are run, the respective lightweight agents, deployed to each respective computing machine, execute instructions to communicate functional test application status between the target computing machines and the remote software deployment system 101. The software deployment system 101 executes instructions to monitor the program test sequences, actions and programs running on the target computing machines. The lightweight agents execute instructions to report errors and/or warnings on the respective computing machines running the functional test applications to the software deployment system 101 as they occur. The lightweight agents can execute instructions to report how many tests are running, a number of iterations run, etc.

The software deployment system 101 can execute instructions to monitor the number of errors and warnings that have occurred while running the functional tests. Further the software deployment system 101 can be configured to execute instructions to filter and sort the errors and warnings that have occurred according to the error and/or warning types, according to the functional tests being run, and/or according to the computing machines on which the functional tests are being run. In monitoring the functional tests, the software deployment system 101 can execute instructions to highlight particular errors and/or warnings and can execute instructions to export monitoring results.

In one example, the software deployment system 101 can execute instructions to export the monitoring results in a batch mode in response to a command line entry to a Comma Separated Value (CSV) file. In another example, the software deployment system 101 can execute instructions to facilitate direct user interaction from a graphical user interface (GUI) on a wired or wireless user interface, e.g., 110-1, 110-2. That is, the software deployment system 101 can execute instructions allow a user to select a particular reported error and/or warning and to open up a desktop window and/or secure shell (e.g., HSSH) to allow a user to directly interact with a particular computing machine while running a particular functional test.

Further, the deployed lightweight agents include instructions that when executed are fully aware of the interfaces and parameters to all utilities available on the software deployment system 101 in addition being able to communicate to one another within and across the multiple systems regardless of the OS type. For example, certain inter-processor communication may be unique to a given processor type. This makes the software deployment system 101 extensible in that the lightweight agents can execute instructions to access certain interfaces on the software deployment system to control and deploy other utilities, e.g., other functional tests for software internal or external to the computing machines.

As such, the lightweight agents can communicate more robust, complete and detailed information on the different functional tests being run concurrently on the plurality of computing machines in the multiple systems and the software deployment system can report more details on those functional test application results than would be possible using agents that are not able to cross communicate with agents on other OS types or are not fully aware of all parameters and utilities available on the software deployment system. In this model, the functional test applications do not have to be aware that it is deployed to a remote computing machine in a remote system, nor do the functional tests have to be network aware.

In some embodiments the software deployment system 101 may further be able to interface with an Integrated Lights Out (ILO) functionality on computing machines in different remote systems to instruct such computing machines to power on or off. The software deployment system 101 may further may further execute instructions to interface with an ILO to remote network boot an OS on one or more of the plurality of computing machines, e.g., PXE booting, that have a deployed agent thereon, e.g., 151, according to logical groupings or other designation. Once a computing machine and/or system is remote booted, the deployed network agent thereon, e.g., 151, can exchange communication, status and coordinate further application deployment between the plurality of computing machines and/or multiple different systems and the software deployment system 101 as the same has been described herein.

In some embodiments, the software deployment system 101 may also execute instructions to deploy functional test applications which look for the presence of security keys and/or valid licenses for certain applications. That is, certain applications are deployed having some security built in and others require a security key or license. The discovery mechanism, deployment of respective agents and functional test deployment can involve executing instructions to ask for such security keys and/or licenses. If such security keys and/or licenses are not found on a given computing machine, then the software deployment system 101 can execute instructions to request one or more different security key types from a particular network (e.g., from a HASP server over a network), host the one or more different security key types locally on the software deployment system 101, and deliver the relevant keys to a given computing machine. Hence, the software deployment system 101 can deploy various functional tests that do not require any security keys and/or licenses as well as deploy various secure versions of functional tests that do require security keys and/or licenses.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment, along with the full range of equivalents to which such claims are entitled.

What is claimed:

1. A method for deployment of software tools across a network, comprising:
   initiating a discovery mechanism to poll a plurality of computing machines from a remote deployment system to multiple systems across the network, wherein the discovery mechanism identifies an operating system (OS) that is on each one of the plurality of computing machines, wherein the multiple systems include rack and blade computing stacks with the plurality of computing machines having different operating systems (OSs);
   deploying respective agents for each type of OS identified in response to the discovery mechanism, wherein each of the respective agents is able to manage communications between the remote deployment system and each of the plurality of computing machines on the network and initiate application installation on each of the plurality of computing machines; and
   creating, by a respective agent of the respective agents, a plurality of logical groupings according to a particular fiber demarcation, wherein the plurality of logical groups each comprises two or more of the plurality of computing machines in a system of the multiple systems, wherein each system of the multiple systems is managed by a different service provider, and concurrently running different functional tests based on identified characteristics and applications deployed by the respective agents according to the plurality of logical groupings wherein the logical groupings are created by bundling an agent for a particular OS (Operating System) type with a particular user specified application to run a functional test.

2. The method of claim 1 wherein, the particular user specified application is selected from one of the group including:
   a base input output system (BIOS) update;
   a software patch;
   a firmware patch; and
   an application to enumerate parameters on a given computing machine.

3. The method of claim 1, wherein initiating the discovery mechanism includes using a plurality of query methods to each of the multiple systems to discover characteristics of each computing machine of the multiple systems on the network including query methods selected from one of the group including:
   an Internet Protocol (IP) address range query for each computing machine of the multiple systems on the network;
   a media access controller (MAC) address query for each computing machine of the multiple systems on the network; and
   a machine name query for each computing machine of the multiple systems on the network.

4. The method of claim 1, wherein using the plurality of query methods includes specifying a text identifier for each of the characteristics to be discovered on the each computing machine of the multiple systems over the network.

5. The method of claim 1, wherein the method further includes deploying respective agents that can communicate with one another across OS types and further includes monitoring the different functional tests.

6. The method of claim 5, wherein the method further includes:
   monitoring the different functional tests, wherein the monitoring includes filtering and sorting in real time by each error type, each warning type, each computing machine, a total number of functional tests conducted and a number of iterations per logical grouping; and providing a graphical user interface (GUI) that allows a user to select an entry item to the filtering and sorting and the remote deployment system opens up a desktop window or a secure socket to a given computing machine such that the user can directly interact with the given computing machine.

7. The method of claim 1, wherein the method further includes deploying secure versions of applications to conduct functional tests and hosting a security key locally on the remote deployment system.

8. A non-transitory computer readable medium including machine executable instructions stored thereon which when executed by a processor cause a deployment system to:
  initiate a discovery mechanism that discovers characteristics, including an operating system (OS) type, from a plurality of computing machines on multiple systems across a network, the multiple systems including at least some computing machines having different operating systems (OSs);
  deploy respective agents able to manage cross talk communications between different OS types, the deployment system and each of the plurality of computing machines on the network, initiate application installation and conduct functional tests on applications on each of the plurality of computing machines for the OS type that is identified; and
  create, by a respective agent of the respective agents, a plurality of logical groupings according to a particular fiber demarcation, wherein the plurality of logical groups each comprises two or more of the plurality of computing machines in a system of the multiple systems, wherein each system of the multiple systems is managed by a different service provider, and concurrently running different functional tests based on identified characteristics and applications deployed by the respective agents according to the plurality of logical groupings wherein the logical groupings are created by bundling an agent for a particular OS type with a particular user specified application to run a functional test.

9. The non-transitory medium of claim 8, and wherein the machine executable instructions further comprise instructions to:
  monitor, including a sort function and a filter function, in real time by the deployment system the different functional tests that are concurrently running, the instructions to monitor including instructions executed according to the sort function and the filter function to monitor and report by an error type, a warning type, a computing machine name, a total number of functional tests conducted and a number of iterations per logical grouping.

10. A deployment system for automatic, remote deployment of applications to multiple systems across a network, comprising:
  a processor; and
  a memory coupled to the processor and including machine executable instructions that can be executed by the processor to:
    initiate characteristic discovery for a plurality of computing machines on multiple systems across the network, wherein the characteristic discovery identifies an operating system (OS) that is on each one of the plurality of computing machines, wherein the multiple systems include rack and blade computing stacks with the plurality of computing machines having different operating systems (OSs);
    deploy respective agents able to manage cross talk communications between different OS types discovered, the deployment system and each of the plurality of computing machines on the network and initiate application installation and conduct functional tests on the applications on each of the plurality of computing machines; and
    create, by a respective agent of the respective agents, a plurality of logical groupings according to a particular fiber demarcation, wherein the plurality of logical groups each comprises two or more of the plurality of computing machines in a system of the multiple systems, wherein each system of the multiple systems is managed by a different service provider, and concurrently running different functional tests based on identified characteristics and applications deployed by the respective agents according to the plurality of logical groupings wherein the logical groupings are created by bundling an agent for a particular OS type with a particular user specified application to run a functional test.

11. The deployment system of claim 10, wherein at least one of the multiple systems is a mobile Performance Optimized Datacenter (POD) and the respective agents are configured to communicate with different out of the box OSs.

12. The deployment system of claim 10 wherein the deployment system includes machine executable instructions that can be executed by the processor to allow selectable deployment of functional test applications through the respective agents to keep track of installed applications and conduct the functional tests on the installed applications according to the logical grouping of the plurality of computing machines based on the characteristics that are identified.

13. The deployment system of claim 10 wherein the machine executable instructions can be executed by the processor to:
  initiate the characteristics discovery of each computing machine of the plurality of computing machines in the multiple systems across the network upon receiving only a root user name and a password; and
  deploy the respective agents as lightweight agents not including an entire OS or applications but sufficient to manage communication, exchange of applications, and status exchange for monitoring between a given computing machine and the deployment system.

* * * * *